May 1, 1928.
E. D. TREANOR
1,668,388
INDICATING DEVICE FOR ELECTRICAL APPARATUS
Filed July 23, 1926
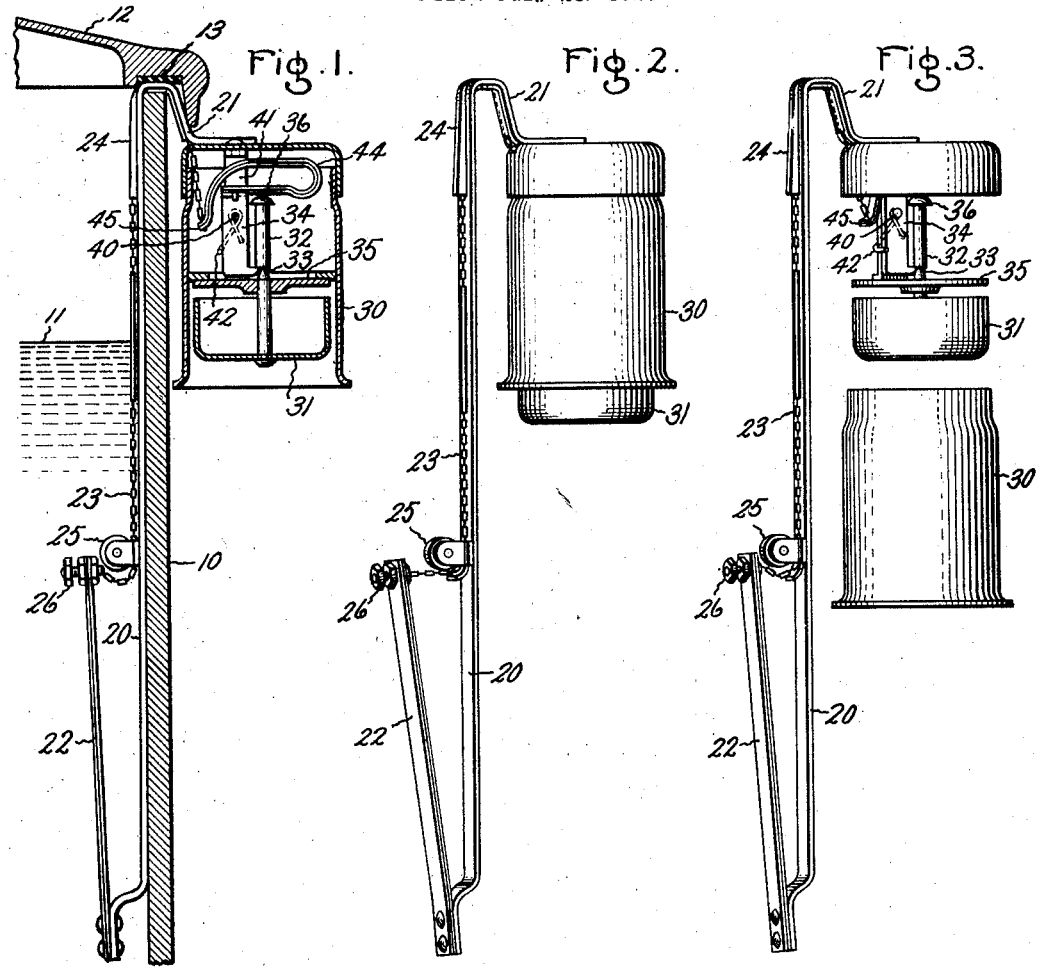
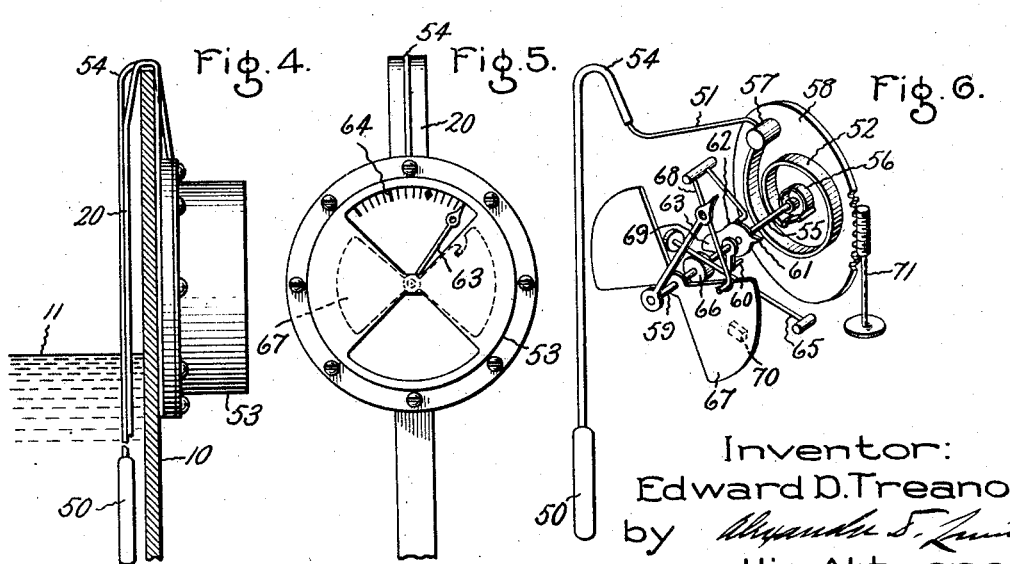
Inventor:
Edward D. Treanor,
by
His Attorney.

Patented May 1, 1928.

1,668,388

UNITED STATES PATENT OFFICE.

EDWARD D. TREANOR, OF PITTSFIELD, MASSACHUSETTS, ASSIGNOR TO GENERAL ELECTRIC COMPANY, A CORPORATION OF NEW YORK.

INDICATING DEVICE FOR ELECTRICAL APPARATUS.

Application filed July 23, 1926. Serial No. 124,527.

This application is a continuation in part of my copending application Serial No. 509,361, filed October 21, 1921, for indicating devices for electrical apparatus.

My invention relates to indicating devices for electrical apparatus and has for its general object an improved construction and arrangement of parts.

More particularly my invention relates to temperature indicating devices which are adapted to be attached to encased electrical apparatus such as transformers, reactors and the like, so that by inspecting the device it may be determined whether such apparatus has at any time during a given period of service been subject to some predetermined limiting temperature.

In supply transformers and the like which are subject to varying and fluctuating loads, it frequently occurs in service that they are subjected for brief intervals to considerable increases in internal temperature due to overloads. The internal temperature of such apparatus (for instance, the temperature of the windings of a transformer which is immersed in oil) is determined principally by the load which the apparatus is carrying and also by the temperature of the air surrounding the casing of the apparatus. If this ambient temperature increases, the oil surrounding the apparatus is less efficiently cooled so that its temperature also increases. A smaller load can then be carried by the apparatus for any predetermined safe maximum internal temperature of the apparatus. It is very desirable to be able to ascertain readily whether and at what times the apparatus has been thus subjected to such temperatures.

To accomplish this end is one of the objects of my invention. In practice, therefore, I provide a device which is rather an accessory for the apparatus than a part of its permanent equipment. Such device, according to my invention, employs an exterior indicating member adapted to be actuated by a thermally responsive element or means disposed within the casing of the apparatus. In conjunction therewith, I also preferably provide means for compensating for different external or ambient temperatures so that the indicator affords indication of actual internal temperature conditions.

For a more complete understanding of the nature and objects of my invention, reference should be had to the following detailed description taken in connection with the accompanying drawing in which Fig. 1 is a fragmentary vertical section through a transformer casing equipped with my invention; Figs. 2 and 3 are perspective views showing details of the indicating device shown in Fig. 1, and Figs. 4, 5 and 6 are similar views showing a modified form of the indicating device.

Like reference characters indicate similar parts in the different views of the drawing.

As shown in Fig. 1, a wall of a casing 10 for an oil submerged electrical apparatus, here assumed to be a transformer, surrounds a body of cooling oil, the oil level being indicated at 11. A cover 12 is fitted down on the wall with a gasket 13 intervening so that the casing will be oil and moisture tight.

The indicating device extends over the upper edge of the casing wall 10 and between it and the cover 12 at a point where the gasket has been partially cut away. The device comprises a frame or strap 20 having an upper inverted U-shaped end 21 fitting down over the edge of the wall 10. The lower end of the frame carries a thermally responsive element operatively connected to the indicator proper which is secured exteriorly of the casing.

In the form of device shown in Figs. 1, 2 and 3, the thermally responsive element comprises a strip 22 of bimetallic or thermostatic metal which bends or is deflected in response to changes in the temperature of the oil in which it is immersed. The upper end of the thermostatic strip 22 is secured to a chain 23 which passes through a tube 24 over the bend of the inverted U-shaped end of the frame 20 to actuate the indicator proper which is secured exteriorly of the casing.

The indicator proper which is suspended from the protruding portion of the end 21 of the frame comprises in this form of my invention a cylindrical casing 30 which houses a basin-shaped member or signal 31 having a stem 32 with a groove 33 adapted to be engaged by a detent 34 to hold the signal 31 normally suspended and concealed within the casing 30. This signal 31, when not retained by the detent 34 is adapted to drop down and depend below the casing 30 so as to be visible from the exterior thereof as shown in Fig. 2. A perforated diaphragm 35 through which the stem 32 passes is secured in the casing to engage with the enlarged upper end 36 of the stem 32 when it is released by the detent 34, thereby preventing the stem from passing therethrough and the signal 31 from dropping wholly out of the casing 30 when released.

The detent 34 is arranged to be actuated by the thermostatically moved chain 23. The detent 34 is pivoted at 40 to a strut 41 depending from the top of the casing where it is fastened to the end 21 of the frame 20. A spring 42 holds the detent in resilient engagement with the groove in the stem 32. Between the detent 34 and the chain 23, however, I prefer to interpose the ambient temperature compensating means which, in this case, comprises the somewhat U-shaped piece of thermostatic metal 44 which is secured to the top of the lever arm of the detent and is proportioned so that when the ambient temperature or temperature of the surrounding atmosphere rises its depending end 45 will move up or toward the top of the casing by an amount such that the resultant movement in response to temperature changes of the electrical apparatus within the casing will be proportional to the changes in internal temperature of the electrical apparatus regardless of any change in the ambient temperature. The end 45 is, of course, connected with the chain 23.

I have shown the chain 23 arranged to be guided in its movements by the sheave or idler 25 secured on the frame 20, while the screw 26 in the end of the thermostatic strip 22 is provided for adjusting the effective length of the chain 23 so that the device may be arranged at will to indicate whenever any predetermined maximum temperature has occurred in the electrical apparatus within the casing 10 to which the thermostatic strip 22 is adjacent.

In operation, when the device has been properly adjusted, the occurrence of the predetermined temperature condition in the encased apparatus will heat the oil within the casing sufficiently to cause the thermostatic strip 22 to bend away from the wall 10 or toward the left of the drawing and draw the chain 23 downwardly. This downward movement of the chain will pull back the detent 34 (the end 45 extending far enough beyond the pivot of the detent to permit the chain to do this) so as to release the signal 31 and allow it to drop and depend from the casing 30 as shown in Fig 2. The signal 31 is preferably painted white or otherwise colored so that its position may be readily ascertained by glancing at the transformer to which the indicating device has been affixed.

For a change in the ambient temperature, the thermostatic piece 44 bends sufficiently to change the adjustment of the chain 23 to compensate for the change in the rate of heat dissipation from the encased apparatus due to changes in the temperature of the surrounding air so that the device operates at a predetermined actual internal temperature of the apparatus rather than of the cooling oil and regardless of changes in the ambient temperature.

In an improved form of my invention shown in Figs. 4, 5 and 6, the frame or strap 20 is similar to the frame 20 of Figs. 1, 2 and 3. The lower end of this frame 20 carries a thermally responsive element in the form of a bulb 50 containing a suitable liquid which expands and contracts in response to changes in the temperature of the oil in which it is immersed. The bulb 50 is connected by a small tube 51 with a Bourdon tube 52 in a casing 53 supported outside the transformer casing 10 by the outer end of the frame 20. The tube 51 is preferably of capillary size and may extend through a slightly larger tube 54 for protection. The thermally expansible liquid extends from the bulb 50 through the tube 51 and into the Bourdon tube 52. The inner end of the Bourdon tube 52 is connnected to a rotatable shaft 55 by a helix of thermostatic metal 56. The outer end of the Bourdon tube is rigidly secured by a post 57 to a supporting plate 58. The movements of the expansible liquid and the Bourdon tube under the influence of changes in temperature of the oil surrounding the bulb 50 correspond to the movements of the thermostatic strip 22 and the chain 23 of Figs. 1, 2 and 3. The thermostatic helix 56 corresponds to the thermostat 44 of Figs. 1, 2 and 3 and compensates in the same way for the effect of changes in ambient temperature on the rate of heat dissipation from the encased apparatus due to changes in ambient temperature. The movements of these temperature responsive elements cause the shaft 55 to rotate through angles which are proportional to the temperature changes of the encased apparatus independently of the effect of changes in ambient temperature which are compensated for by the action of the thermostatic helix 56.

A second shaft 59 has an arm 60 extending into the path of a projection 61 on a cam 62 secured to the shaft 55. The shaft also carries a pointer 63 which moves over a suitable scale 64. The parts described are so arranged that the shaft 55 and the cam 62 will rotate in a clockwise direction in response to an increasing temperature of the encased apparatus, the projection 61 of the cam serving to move the pointer 63 along the scale 64. The shaft 55 and cam 62 will, of course, rotate in a counterclockwise direction in response to a decreasing temperature of the encased apparatus but the pointer 63 will remain in its maximum position on the scale 64, being retained in that position by the friction of a weighted arm 65 which rests upon a disk 66 secured to the shaft 59.

A signal 67, pivoted on the shaft 59, is normally retained in a horizontal position by a pivoted latch member 68. When the temperature of the encased apparatus reaches a predetermined maximum limit, a second projection 69 on the cam 62 engages and trips the latch member 68, disengaging it from the signal 67 and permitting the signal to assume a vertical position. One end of the signal 67 may be provided with a small weight 70 or otherwise made heavier than the other end so that the signal will assume a vertical position under the influence of gravity when released from the latch member 68. The front of the casing 53 is provided with vertically disposed windows so that the signal 67 is concealed when in its normal horizontal position but is visible through the windows when in its vertical position. The function of this signal, just as in the case of the signal 31 of Figs. 1, 2 and 3, is to indicate that the temperature of the encased apparatus or the load carried thereby has reached some predetermined maximum value since the signal was last reset in its normal concealed position.

The angular position of the plate 58 which supports the Bourdon tube 52 may be adjusted by an adjusting screw 71 to correct any inaccuracy in the position of the pointer 63 over the scale.

The scale 64 may be graduated in any suitable units. It may, for instance, be marked to indicate the temperature of the encased apparatus. It is obvious, however, that the point on the scale which corresponds to the maximum safe temperature of the encased apparatus may be marked to indicate that the apparatus is carrying its maximum or full safe load under the conditions existing at the time, the remaining points of the scale being marked to indicate percentages of this full load.

The invention has been described in the forms which are at present considered most desirable but it is obvious that changes may be made without departing from the scope of the invention as pointed out in the appended claims.

What I claim as new and desire to secure by Letters Patent of the United States, is:—

1. The combination with electrical apparatus immersed in a cooling medium within a casing, of an indicating device comprising means responsive to temperature changes in the cooling medium surrounding said apparatus, indicating means connected to be actuated by said temperature responsive means, and means responsive to temperature changes in the surrounding air connected and arranged to modify the actuation of said indicating means to compensate for changes in the rate of heat dissipation from said encased apparatus due to changes in said air temperature, whereby conditions of said apparatus may be indicated regardless of changes in said air temperature.

2. An indicating device for encased electrical apparatus, the casing of said apparatus having a cover supported on the upper edge of its wall, said device comprising a thermally responsive element adapted to move under the influence of heat generated by the electrical apparatus, a normally concealed indicating member, means actuated by said element for causing said indicating member to be moved out of concealment, and a frame shaped to engage with and fit over the upper edge of the wall and under the cover of the apparatus casing, said frame being arranged to carry said thermally responsive element within the casing and to carry said indicating member outside of said casing.

3. An indicating device for encased electrical apparatus, the casing of said apparatus having a cover supported on the upper edge of its wall, said device comprising an element adapted to move in response to temperature changes in said apparatus, an indicating member adapted to be moved to indicate the occurrence of a pre-determined temperature condition, actuating means between said element and member, and a frame adapted to engage with and fit over the upper edge of the wall and under the cover of the apparatus casing, said frame carrying said element, said indicating member and said actuating means.

4. An indicating device for encased electrical apparatus, the casing of said apparatus having a cover supported on the upper edge of its wall, said device comprising a frame adapted to engage with and fit over the upper edge of the wall and under the cover of the apparatus casing, means responsive to temperature changes in said apparatus, and indicating means actuated by said temperature responsive means, said temperature responsive means being carried at one end of said frame to be supported inside of said casing, and said indicating means being carried at the other end of said frame to be supported outside of said casing.

5. The combination with electrical apparatus immersed in a cooling medium within a casing, of an indicating device comprising a bulb containing a liquid adapted to expand and contract in response to temperature changes in the cooling medium surrounding said apparatus, a Bourdon tube connected to said bulb and movable in response to the expansion and contraction of said liquid, indicating means connected to be actuated by said Bourdon tube, and a thermostat responsive to temperature changes in the surrounding air connected and arranged to modify the actuation of said indicating means to compensate for changes in the rate of heat dissipation from said encased apparatus due to changes in said air temperature, whereby conditions of said apparatus may be indicated regardless of changes in said air temperature.

6. An indicating device for encased electrical apparatus, the casing of said apparatus having a cover supported on the upper edge of its wall, said device comprising means responsive to temperature changes in said apparatus, indicating means connected to said temperature responsive means to be actuated thereby, and a frame supporting said temperature responsive means and said indicating means, said frame being formed to engage with and fit over the upper edge of the wall and under the cover of the casing of said apparatus with the temperature responsive means inside the casing and the indicating means outside the casing.

In witness whereof, I have hereunto set my hand this 21st day of July, 1926.

EDWARD D. TREANOR.